(12) United States Patent
Finn et al.

(10) Patent No.: US 8,797,327 B2
(45) Date of Patent: Aug. 5, 2014

(54) PRODUCT VISUALIZATION AND INTERACTION SYSTEMS AND METHODS THEREOF

(75) Inventors: Gavin Alexander Finn, Framingham, MA (US); Joshua Edward Smith, Barre, MA (US)

(73) Assignee: Kaon Interactive, Maynard, MA (US)

( * ) Notice: Subject to any disclaimer, the term of this patent is extended or adjusted under 35 U.S.C. 154(b) by 1075 days.

(21) Appl. No.: 11/375,508

(22) Filed: Mar. 14, 2006

(65) Prior Publication Data

US 2008/0012863 A1    Jan. 17, 2008

(51) Int. Cl.
*G06T 13/00* (2011.01)
*G06T 19/20* (2011.01)
*G06T 13/20* (2011.01)

(52) U.S. Cl.
CPC ............... *G06T 13/20* (2013.01); *G06T 19/20* (2013.01); *G06T 2219/2016* (2013.01)
USPC ........... 345/473; 345/156; 345/358; 345/419; 345/418; 345/426; 345/441; 345/463; 345/581; 345/619; 345/653; 345/664; 345/679; 705/26; 705/27

(58) Field of Classification Search
USPC ......... 345/156, 358, 419, 418, 426, 441, 463, 345/581, 619, 653, 664, 679; 705/26, 27
See application file for complete search history.

(56) References Cited

U.S. PATENT DOCUMENTS

| | | | | |
|---|---|---|---|---|
| 3,727,874 | A * | 4/1973 | Wuensch | 248/459 |
| 6,046,850 | A * | 4/2000 | Cunanan | 359/472 |
| 6,343,264 | B1 * | 1/2002 | Fenton et al. | 703/6 |
| 6,381,583 | B1 * | 4/2002 | Kenney | 705/26 |
| 6,783,247 | B2 * | 8/2004 | White | 353/79 |
| 6,961,713 | B2 * | 11/2005 | Perkowski | 705/27 |
| 7,196,733 | B2 * | 3/2007 | Aratani et al. | 348/581 |
| 8,321,797 | B2 * | 11/2012 | Perkins | 715/757 |
| 2002/0113802 | A1 * | 8/2002 | Card et al. | 345/619 |
| 2002/0198791 | A1 * | 12/2002 | Perkowski | 705/26 |
| 2003/0067418 | A1 * | 4/2003 | McClintock | 345/1.1 |
| 2003/0142236 | A1 * | 7/2003 | Aratani et al. | 348/554 |
| 2003/0197737 | A1 * | 10/2003 | Kim | 345/781 |
| 2003/0227453 | A1 * | 12/2003 | Beier et al. | 345/419 |
| 2004/0047013 | A1 * | 3/2004 | Cai et al. | 359/15 |
| 2005/0086612 | A1 * | 4/2005 | Gettman et al. | 715/848 |
| 2005/0233290 | A1 | 10/2005 | Jackson | |
| 2005/0237382 | A1 * | 10/2005 | White | 348/14.16 |
| 2005/0251458 | A1 * | 11/2005 | Perkowski | 705/26 |
| 2005/0253840 | A1 | 11/2005 | Kwon | |
| 2005/0255434 | A1 * | 11/2005 | Lok et al. | 434/262 |
| 2006/0244749 | A1 * | 11/2006 | Kondo et al. | 345/427 |
| 2008/0122786 | A1 * | 5/2008 | Pryor et al. | 345/156 |
| 2009/0076786 | A1 * | 3/2009 | Minchew et al. | 703/6 |

* cited by examiner

*Primary Examiner* — Abderrahim Merouan
(74) *Attorney, Agent, or Firm* — LeClairRyan, A Professional Corporation

(57) ABSTRACT

A method and system for displaying one or more products includes displaying a virtual, three-dimensional view of at least one product on a display system, selecting at least one action with the virtual, three-dimensional view of the product, and displaying a three-dimensional animation of the selected action with the product on the display system.

46 Claims, 10 Drawing Sheets

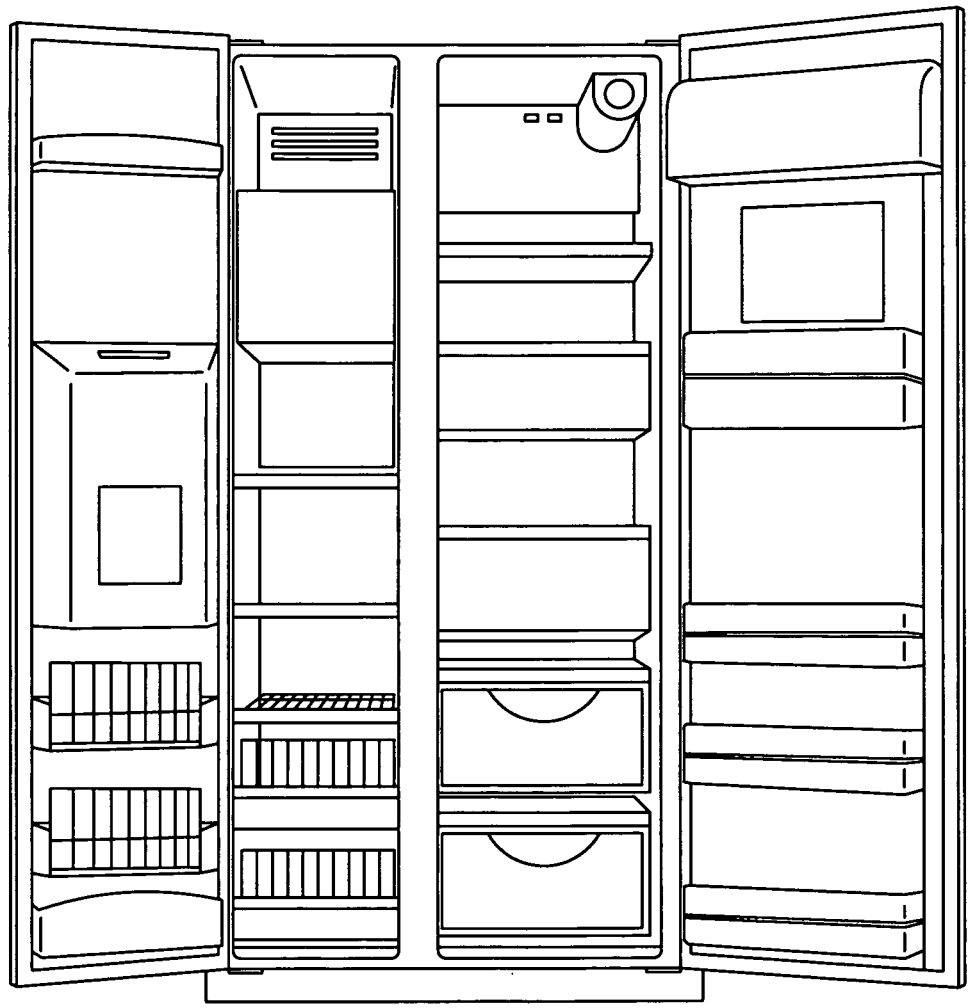
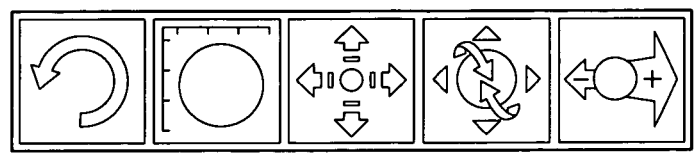
DOORS OPEN
*FIG. 6*

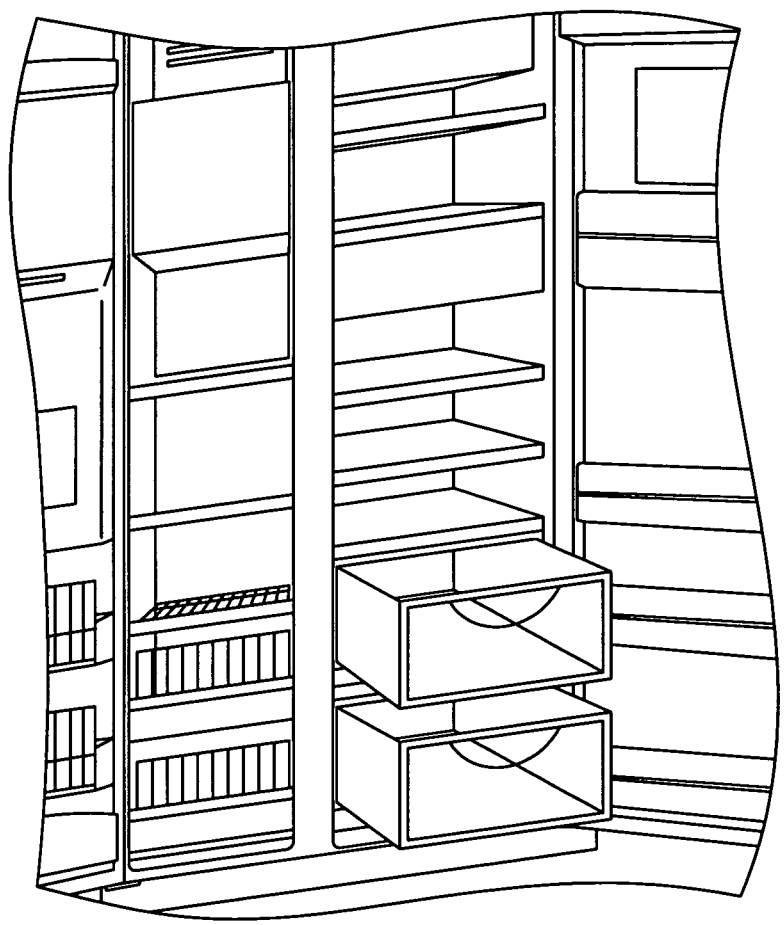
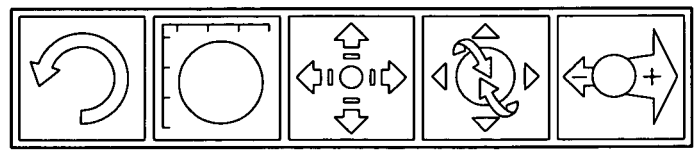
OPEN DRAWERS
*FIG. 7*

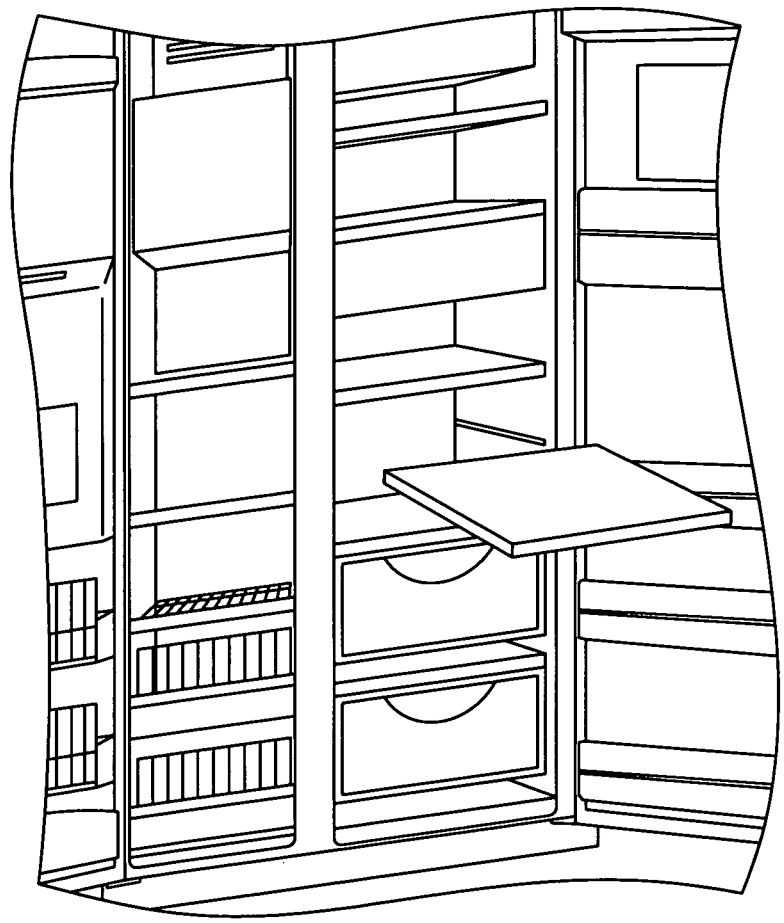
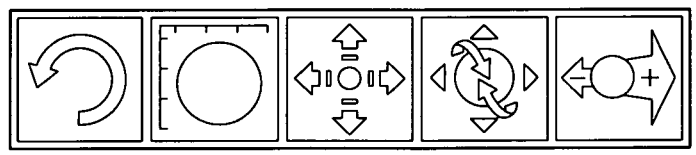
SWAP SHELVES
FIG. 8

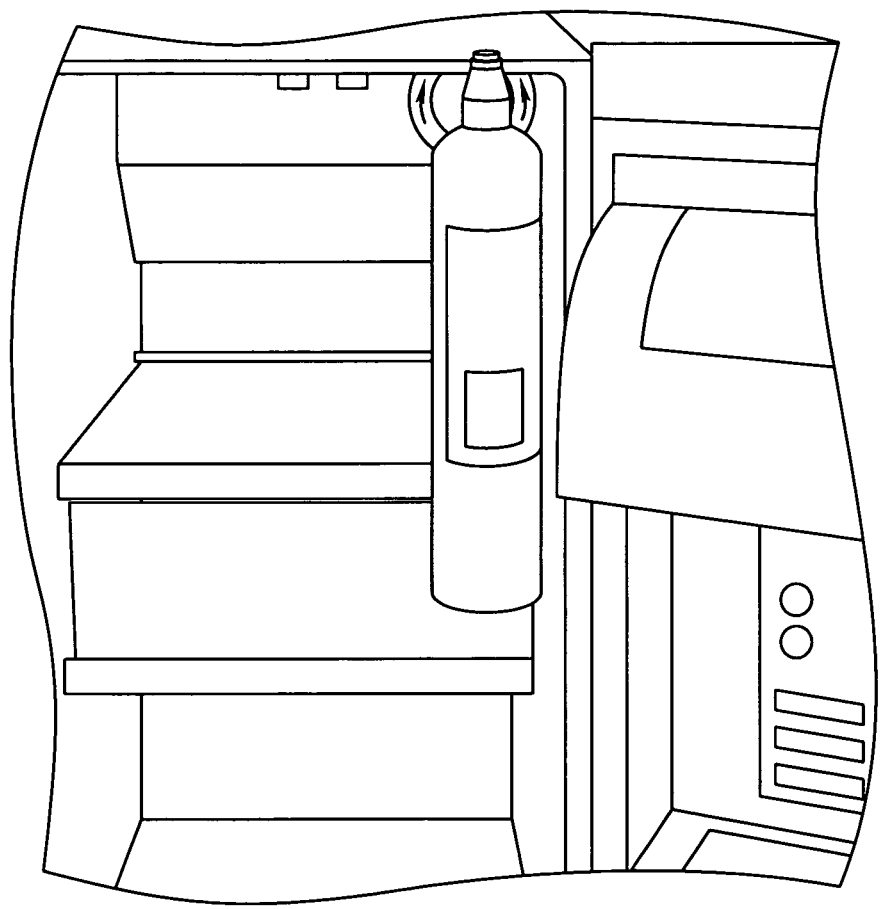
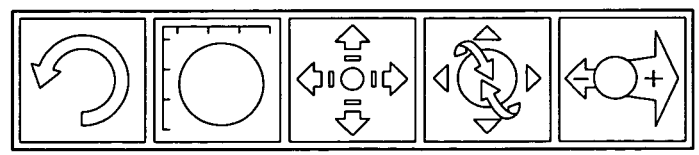
REMOVE WATER FILTER
*FIG. 9*

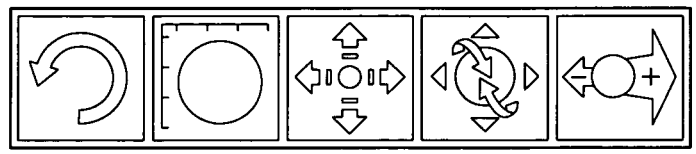
SHOW FOOD
*FIG. 10*

PRODUCT VISUALIZATION AND INTERACTION SYSTEMS AND METHODS THEREOF

FIELD OF THE INVENTION

This invention generally relates to display systems for products and methods and, more particularly, to systems for providing in-store, product visualization and interaction systems and methods thereof.

BACKGROUND

To promote products and generate sales, typically "brick and mortar" types of retail environments utilize floor and shelf space to display products to potential consumers. This type of display marketing helps promote the sales of the displayed products because potential customers can both see and interact with the actual products.

Unfortunately, the floor and shelf space in "brick and mortar" types of retail environments is often limited so potential customers often only see a portion of the potential products which are available for purchase. This is particularly problematic for the sale of larger sized products, such as appliances or lawn tractors, which take up substantial amounts of floor space and often have a variety of different options, colors, and finishes. As a result, sales of products which may have been generated if the products had been on the floor are lost because the potential customers are either uncomfortable purchasing the products without actually seeing and interacting with them or are just unaware of the availability of those products for sale.

Additionally, in these "brick and mortar" types of retail environments the cost of the floor and shelf space can be expensive so retailers must be selective on the particular types and models of products they can display. Again, without the products on display on the sales floor, sales of the products which are not on display often are lost.

Some retailers have tried to address this dilemma through the use of internet web sites and/or in-store kiosks where additional types and models of products are on display. These internet web sites and kiosks are helpful in generating additional sales revenue, but unfortunately the displays on the internet and kiosks provide limited, if any, interaction with the products and components of the products so potential customers do not gain much of an appreciation of how the products and particular parts of the products look and operate. Additionally, these internet web-sites and kiosks do not display the products in a life-sized, interactive format which further limits any true visual appreciation the potential customer might obtain about how the products work and operate. Further, in the case of internet web sites, these still do not address the dilemma faced by potential customers that are not shopping on-line, but instead still just walk into the retail environment and again are only exposed to the limited selection of all of the possible products.

SUMMARY

A method for displaying one or more products in accordance with embodiments of the present invention includes displaying a virtual, three-dimensional view of at least one product on a display system, selecting at least one action with the virtual, three-dimensional view of the product, displaying a virtual, three-dimensional animation of the selected action, and displaying key textual sales or marketing messaging associated with the product on the display system.

A system for displaying one or more products in accordance with embodiments of the present invention includes a display system that displays a virtual, three-dimensional view of a product, a selection system, and an interactive display processing system. The selection system selects in response to operator input at least one of one or more actions taken with the virtual, three-dimensional view of the product. The interactive display processing system stores and provides the virtual, three-dimensional view of the product to the display system and stores and provides a virtual, three-dimensional animation of the one or more of the actions to the display system based on the selections from the selection system.

A method for making a system for displaying one or more products in accordance with embodiments of the present invention includes providing a display system that displays a virtual, three-dimensional view of a product. A selection system is provided that selects in response to operator input at least one of one or more actions taken with the virtual, three-dimensional view of the product. An interactive display processing system is provided that stores and provides the virtual, three-dimensional view of the product to the display system and stores and provides a virtual, three-dimensional animation of the one or more of the actions to the display system based on the selections from the selection system.

The present invention provides a number of advantages including providing an effective system and method for displaying products in a retail or other "bricks and mortar" type consumer environment, such as a store, a mall, or even an airport, where customers can interact with each of the products. The present invention reduces or eliminates the need for shelf or floor space and even for inventory of the products being sold which helps to reduce overhead costs. Additionally, the present invention enables a retailer to expand the number of products being offered because of this reduction or elimination of physical storage space needed for displaying the products for sale.

Another advantage of embodiments of the present invention is that it provides an interactive, substantially life-size display format for each of the products to give a potential customer a realistic view of and appreciation of how the product and parts of the product actually look and how it/they work(s). As a result, a potential customer gets virtually the same experience whether seeing and interacting with the actual product or with the product being displayed in a system in accordance with the present invention.

Yet another advantage of the present invention is that it provides a potential customer not only the ability to see a product, but also to see and interact with various operational and static aspects of the product in a three-dimensional setting. By way of example only, with the present invention a potential consumer can open and close different components of the product, move the product or components of the product, and watch different aspects of the product in operation. Additionally, with the present invention a potential customer can interact with the product to see how different static features of the product would appear, such as different colors, textures, and finishes under different lighting conditions and viewing angles.

A further advantage of the present invention is that it can be used to train associates on new lines of products without the need for off-site training or to dedicate a specific training time because the products can be viewed at any time. Additionally, with the present invention the lines of product being displayed can be quickly and easily updated and these updates can be done from a remote management location. Further, the present invention can easily be integrated into other store systems, such as an order processing system or an inventory control system.

BRIEF DESCRIPTION OF THE DRAWINGS

FIG. 6 is a screen shot from an animation of a door of a refrigerator opening on the product visualization and interaction system;

FIG. 7 is a screen shot from an animation of drawers of the refrigerator opening on the product visualization and interaction system;

FIG. 8 is a screen shot from shelves being selected and swapped in the refrigerator opening on the product visualization and interaction system;

FIG. 9 is a screen shot from an animation of a water filter being removed for replacement in the refrigerator on the product visualization and interaction system; and FIG. 10 is a screen shot from an animation of selected scale size items of food and beverage in the refrigerator on the product visualization and interaction system.

DETAILED DESCRIPTION

Figure 1:
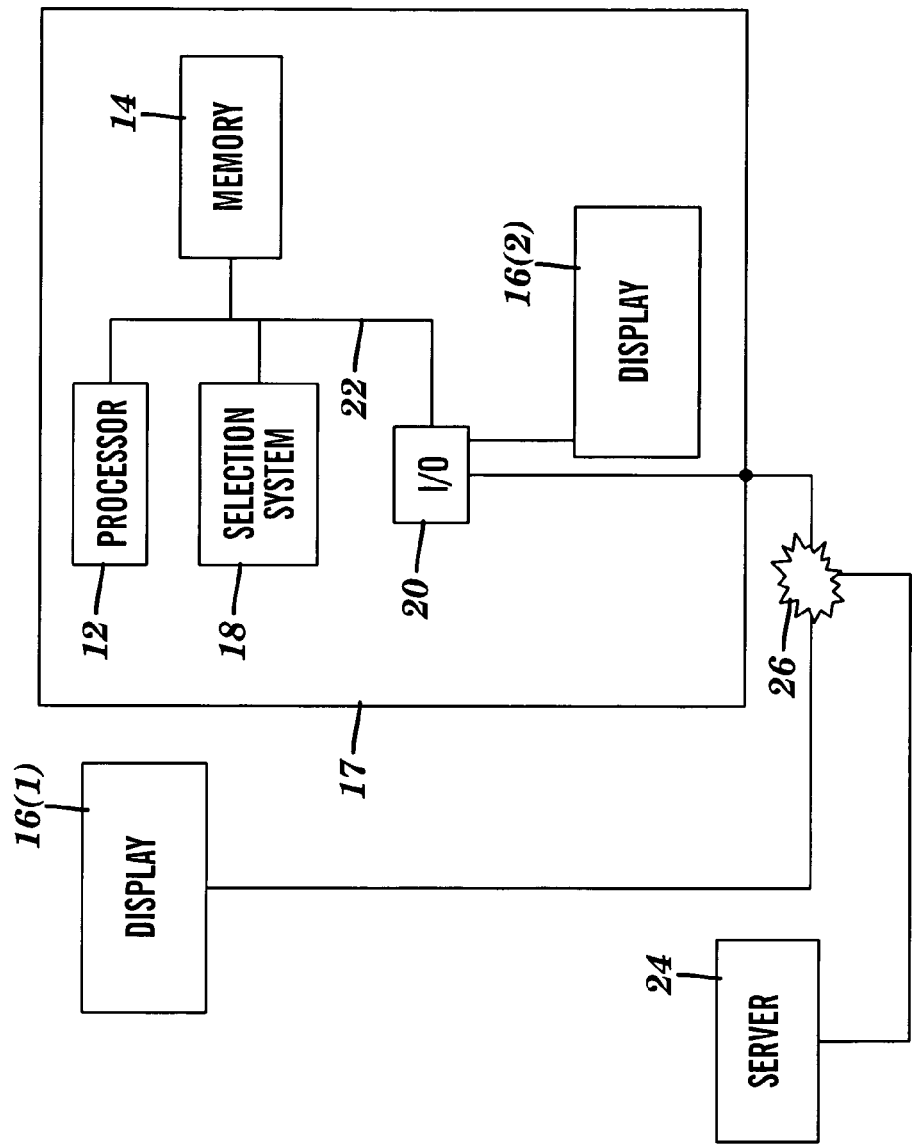
FIG. 1 is a block diagram of a product visualization and interaction system in accordance other embodiments of the present invention.
Figure 2:
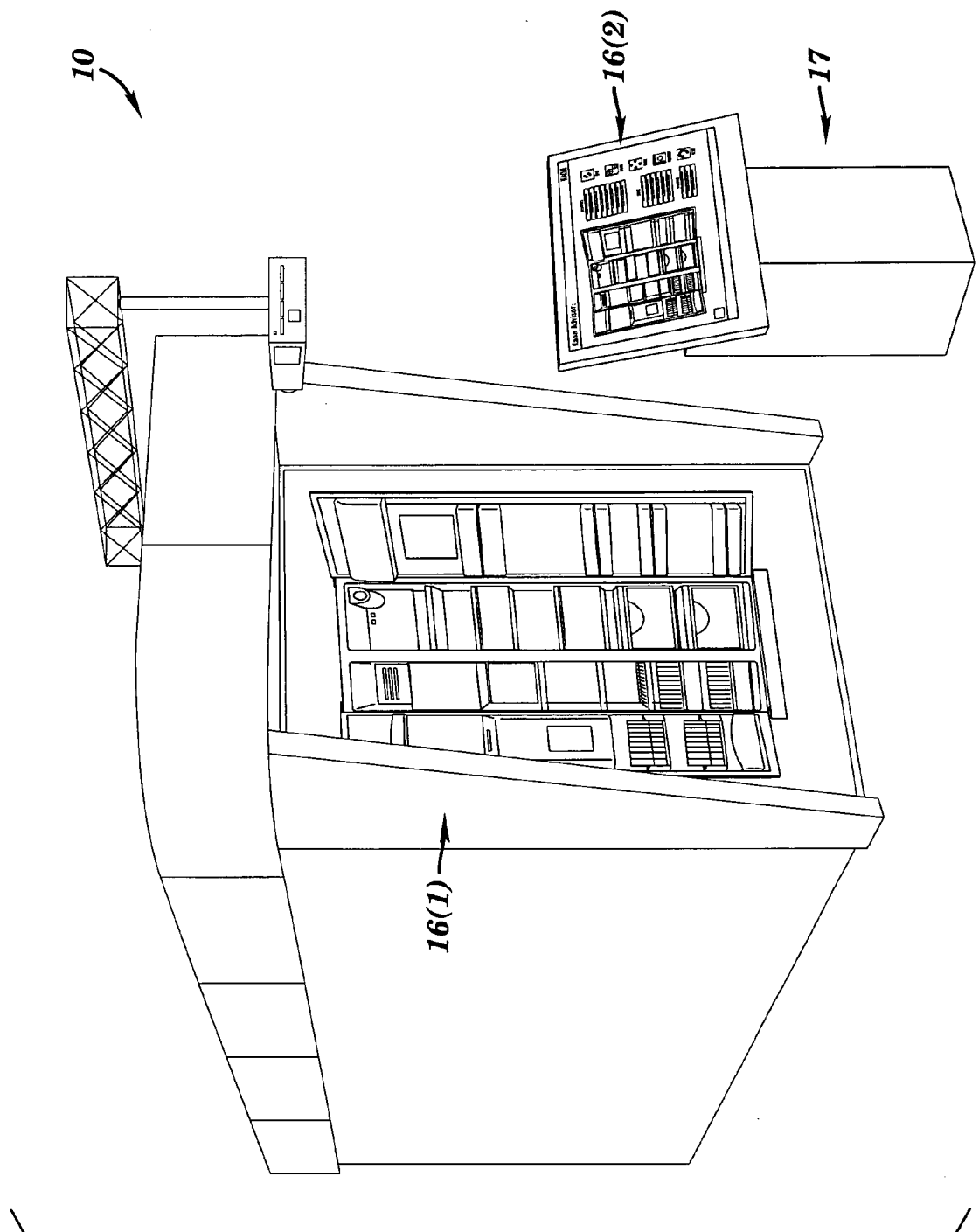
FIG. 2 is a perspective view of the product visualization and interaction system shown in FIG. 1 with a substantially life-size display and a platform interaction system.
Figure 3:
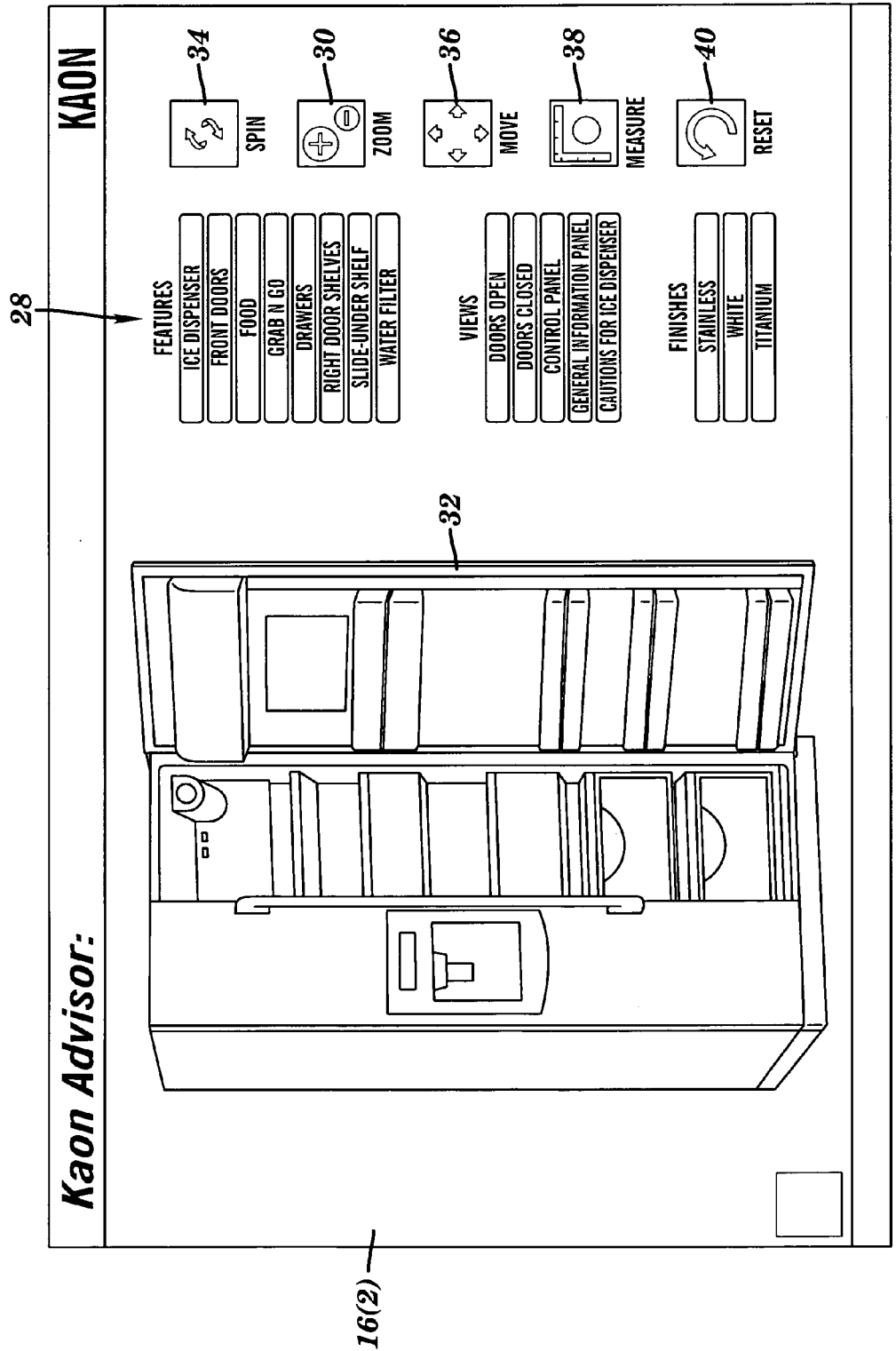
FIG. 3 is a screen shot of a product on the product visualization and interaction system.
Figure 4:
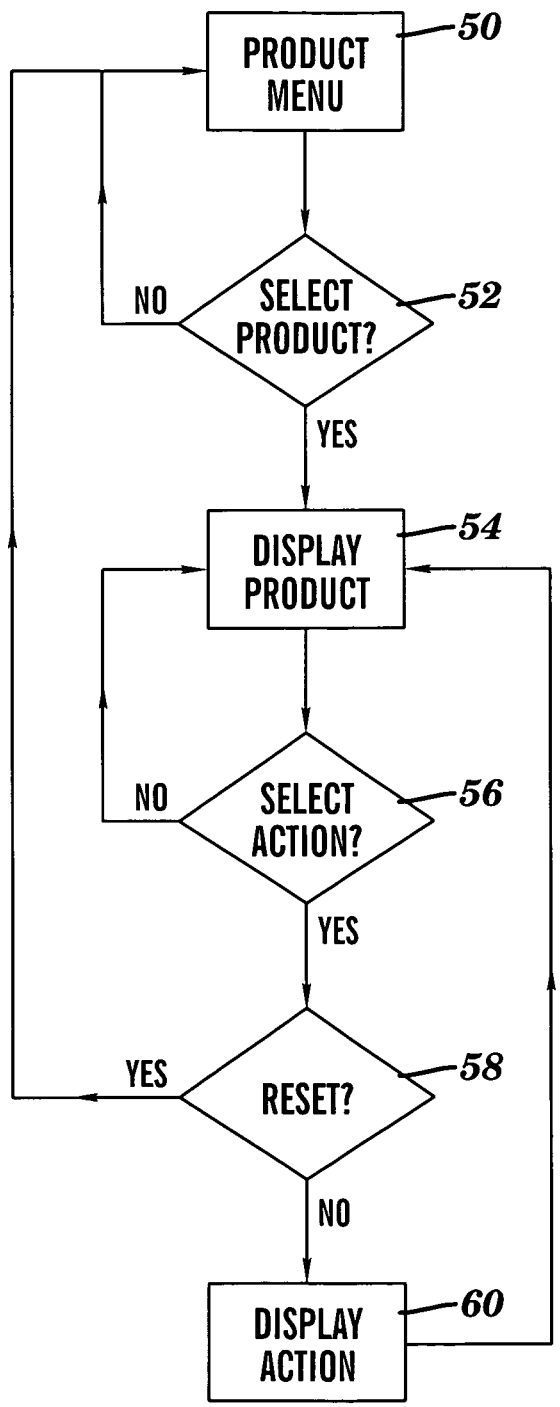
FIG. 4 is a flow chart of a method for displaying and interacting with one or more products in accordance with embodiments of the present invention.

A product visualization and interaction system 10 system for displaying one or more products in accordance other embodiments of the present invention is illustrated in FIGS. 1-3. The product visualization and interaction system 10 is on the floor of a retail store and comprises a display system 16(1) and a platform interaction system 17 with a display system 16(2), although the system 10 can be at other consumer environments and can comprise other numbers and types of components in other configurations. The present invention provides an effective system and method for displaying products in a retail or other consumer environment, such as a store, a mall, or even an airport, where customers can visualize and interact with each of the products and components of the products in a virtual, three-dimensional space.

Referring more specifically to FIGS. 1 and 2, the display system 16(1) is sized to provide a substantially life-size view of a product and enables a user, such as a potential customer, to select and interact in a virtual, three-dimensional space with this product and with various parts or components of the product, although display 16(1) could comprise other numbers and types of displays in other sizes. As a result, with this large display 16(1) a user gets the same experience whether seeing and interacting with the actual product or with the product being displayed in a substantially life-size format on display 16(1). In this particular embodiment the display system 16(1) comprises a 6'×8' screen, together with a rear-projection projector, and a bus or other link to the central processing unit (CPU) 12 which generates and controls the manipulations of the virtual model, although other types and numbers of displays could be used.

The platform interaction system 17 is coupled to and controls the view of the product on the display system 16(1) based on input actions from the user. The platform interaction system 17 comprises a central processing unit (CPU) or processor 12, a memory 14, a display system 16(2), a selection system 18, and an input/output interface system 20 which are coupled together by a bus 22 or other link, although the platform interaction system 17 can comprise other numbers and types of each of the components and other configurations and locations for each of the components can be used. For example, the processor 12 and memory 14 could be in other systems at other locations.

The processor 12 executes a program of stored instructions for one or more aspects of the present invention as described and illustrated herein, including the method for providing a virtual three-dimensional view of a product which can be interacted, although the processor 12 could execute other types of programmed instructions. The memory 14 stores these programmed instructions for one or more aspects of the present invention as described herein, although some or all of the programmed instructions could be stored and/or executed elsewhere, such as in a management server system 24. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to one of the processor 12, can be used for the memory 14.

The display system 16(2) also provides a view of the product with a menu of actions for a user to select and interact with the product on display shown in FIG. 3, although other numbers and types of displays in other configurations can be used. The menu of actions for interacting with the product on the display system 16(2) comprises different features, views, and options, such as surface finishes, which can be selected for interaction along with other actions: spin; zoom; move; measure; and reset which can be selected, although the display system 16(2) can comprise other numbers and types of actions in other configurations on the display 16(2). In this particular embodiment the display system 16(2) comprises a large dimension (32" or greater measured on the diagonal), flat panel LCD display device, although other types and numbers of displays in other configurations could be used.

The selection system 18 comprises an interactive touch screen device mounted on, and integrated with the display system 16(2) that allows a user to interact with the product on the display system 16(2), although other types and numbers of display systems in other configurations could be used. By way of example only, the selection system 18 could comprise a voice activated interaction system or a user input device which is coupled to and spaced from the platform interaction system 17, such as a keyboard or a computer mouse.

The input/output interface system 20 is used to operatively couple and communicate between the platform interaction system 17, the display system 16(2) and a management server system 24 via communications system 26, although other types and numbers of connections and other configurations could be used. In this particular embodiment, the communication system 26 is a SCSI direct cable connection, although other types and numbers of communication systems, such as a local area network, a wide area network, the world wide web, modems and phone lines, e-mails, and/or wireless communication technology each having their own communications protocols, could be used.

The management server system 24 is used to provide and update information about the products which can be selected for display on the display systems 16(1) and 16(2) in the platform interaction system 17, although the management server system 24 could have other functions. Additionally, the management server system 24 can receive and store data about each interaction with the platform interaction system 17 and/or one of the display systems 16(1) and 16(2) and can use the data for a variety of purposes, such as to reconfigure the data provided by the management server system 24 to the platform interaction system 17 about the products to make highly requested actions easier to retrieve. The management server system 24 includes a central processing unit (CPU) or processor, a memory, and an input/output interface system which are coupled together by a bus or other link, although other numbers and types of each of the components and other configurations and locations for the components can be used. The processor in the management server system 24 executes a program of stored instructions for one or more aspects of the present invention as described herein. The memory stores these programmed instructions for one or more aspects of the present invention as described herein, although some or all of the programmed instructions could be stored and/or executed elsewhere, such as in one or memories of provider systems. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in the management server system 24. The input/output interface system in the management server system 24 is used to operatively couple and communicate between the management server 24 and the product visualization and interaction systems 10.

Although the product visualization and interaction system 10 is described and illustrated herein as implemented in the display system 16(1), the platform interactive platform interaction system 17 with the display system 16(2) and a management server system 24, each of the systems of the present invention may be implemented on any suitable computer system or computing device. It is to be understood that the devices and systems of the exemplary embodiments are for exemplary purposes, as many variations of the specific hardware used to implement the exemplary embodiments are possible, as will be appreciated by those skilled in the relevant art(s).

Furthermore, each of the systems of the present invention may be conveniently implemented using one or more general purpose computer systems, microprocessors, digital signal processors, micro-controllers, and the like, programmed according to the teachings of the present invention as described and illustrated herein, as will be appreciated by those skilled in the computer and software arts.

In addition, two or more computing systems or devices can be substituted for any one of the systems in any embodiment of the present invention. Accordingly, principles and advantages of distributed processing, such as redundancy, replication, and the like, also can be implemented, as desired, to increase the robustness and performance of the devices and systems of the exemplary embodiments. The present invention may also be implemented on computer systems that extend across any network using any suitable interface mechanisms and communications technologies including, for example telecommunications in any suitable form (e.g., voice, modem, and the like), wireless communications media, wireless communications networks, cellular communications networks, G3 communications networks, Public Switched Telephone Network (PSTNs), Packet Data Networks (PDNs), the Internet, intranets, a combination thereof, and the like.

The present invention may also be embodied as a computer readable medium having instructions stored thereon for generating a model for simulating systems of reacting species, which when executed by a processor, cause the processor to carry out the steps necessary to implement the methods of the present invention. The computer readable medium may also include programmed instructions for carrying out any of the other steps described and illustrated herein with respect to the methods of the present invention.

The operation of the product visualization and interaction systems 10 will now be described with reference to FIGS. 1-4. In step 50, the product visualization and interaction systems 10 is engaged and the displays systems 16(1) and 16(2) display a menu of products which can be viewed and selected for viewing and interaction. In this particular example, a list of different refrigerators is displayed on the display system 16(2).

In step 52, a user can use the selection system 18, which in this particular embodiment is a touch screen on the display system 16(2), to select one of the products for viewing and interaction. If the user does not select a product in step 52, then the No branch is taken back to step 50 where the menu of products remains on the display system 16(2), although other types of displays might be shown, such as a screen saver until the system 10 is engaged again by a user. If the user does select a product in step 52, then the Yes branch is taken to step 54.

In step 54, the data to display the selected product is retrieved from the management server system 24 and is provided to the platform interaction system 17, although the data may be obtained from other sources or may already be stored in the memory 14 of the platform interaction system 17. The selected product is displayed in a substantially life-size format on the display system 16(1) and the selected product, which is a smaller scale sized version of the actual product, along with a menu of actions for interacting with the product is on the display system 16(2), although other configurations could be used, such as having the product and menu all on one display system. In this particular example, a refrigerator has been selected and is displayed on the system 16(1) and on the display system 16(2) as shown in FIGS. 2 and 3.

Referring to FIG. 3, the menu of actions for interacting with the product in this example comprises three different categories of actions: features; views; and finishes along with the additional actions of: spin; zoom; move; measure; and reset, although the numbers, types and/or categories of actions can vary as necessary and desired for the particular application. In this particular example, under the features category the actions a user can select are: Ice Dispenser; Front Doors; Food; Grab N Go; Drawers; Right Door Shelves; Slide-Under Shelf; and Water Filter. Under the views category, the actions a user can select are: Doors Open; Doors Closed; Control Panel; General Information Panel; and Cautions for Ice Dispenser. Under the finishes category, the actions a user can select are: Stainless; White; and Titanium. The type and number of actions under each category can vary as needed or desired for the particular application.

Referring back to FIG. 4, in step 56 the user can select one of the actions from the menu on the display system 16(2) using the selection system 18. If the user does not select an action in step 56, then the No branch is taken back to step 54 where the menu of actions for the product remains on the display system 16(2), although again other types of displays might be shown, such as a screen saver until the system 10 is engaged again by a user. If the user does select a product in step 56, then the Yes branch is taken to step 58.

In step 58, the system 10 determines if the reset action has been selected using the selection system 18. If the user has selected the reset action in step 58, then the Yes branch is taken back to step 50 where the menu of products is displayed. If the user has selected an action, but has not selected the reset action in step 58, then the Yes branch is taken to step 60.

In step 60, the action selected by the user is displayed on the display systems 16(1) and 16(2), although the action may be displayed on just one of the display systems, such as display system 16(1). The types of actions which are displayed are virtual, three-dimensional animations that illustrate the product or components or parts of the product. By way of example only, the selected action for display shows animations of: a door of the refrigerator opening as shown in FIGS. 2, 3, and 6; the door of a refrigerator closing; the selection and opening of drawers as shown in FIG. 7; the selection and swap of shelves in the refrigerator as shown in FIG. 8; the removal and replacement of the water filter as shown in FIG. 9; the selection and placement of scale size items of food and beverages on the shelves of the refrigerator to show how much and what particular areas of the refrigerator can hold as shown in FIG. 10; the operation of different buttons on the control panel; the ice dispenser in operation dispensing ice; the removal of a component or part of the refrigerator and views of two or more sides of the component or part; and changes of finish, lighting, and texture. Additionally, the virtual three-dimensional animations and interactive features include actions for spinning, zooming in or out, moving, and/or measuring the refrigerator and/or components or parts of the refrigerator. Again the particular actions offered by the product visualization and interaction system 10 will vary as needed or desired for the particular application.

Accordingly, the present invention provides an interactive, substantially life-size display format for each of the products to give a potential customer a realistic view of and appreciation of how the product and parts of the product work. With the present invention, a potential customer gets virtually the same experience whether seeing and interacting with the actual product or with the product being displayed in the product visualization and interaction system.

Figure 5:
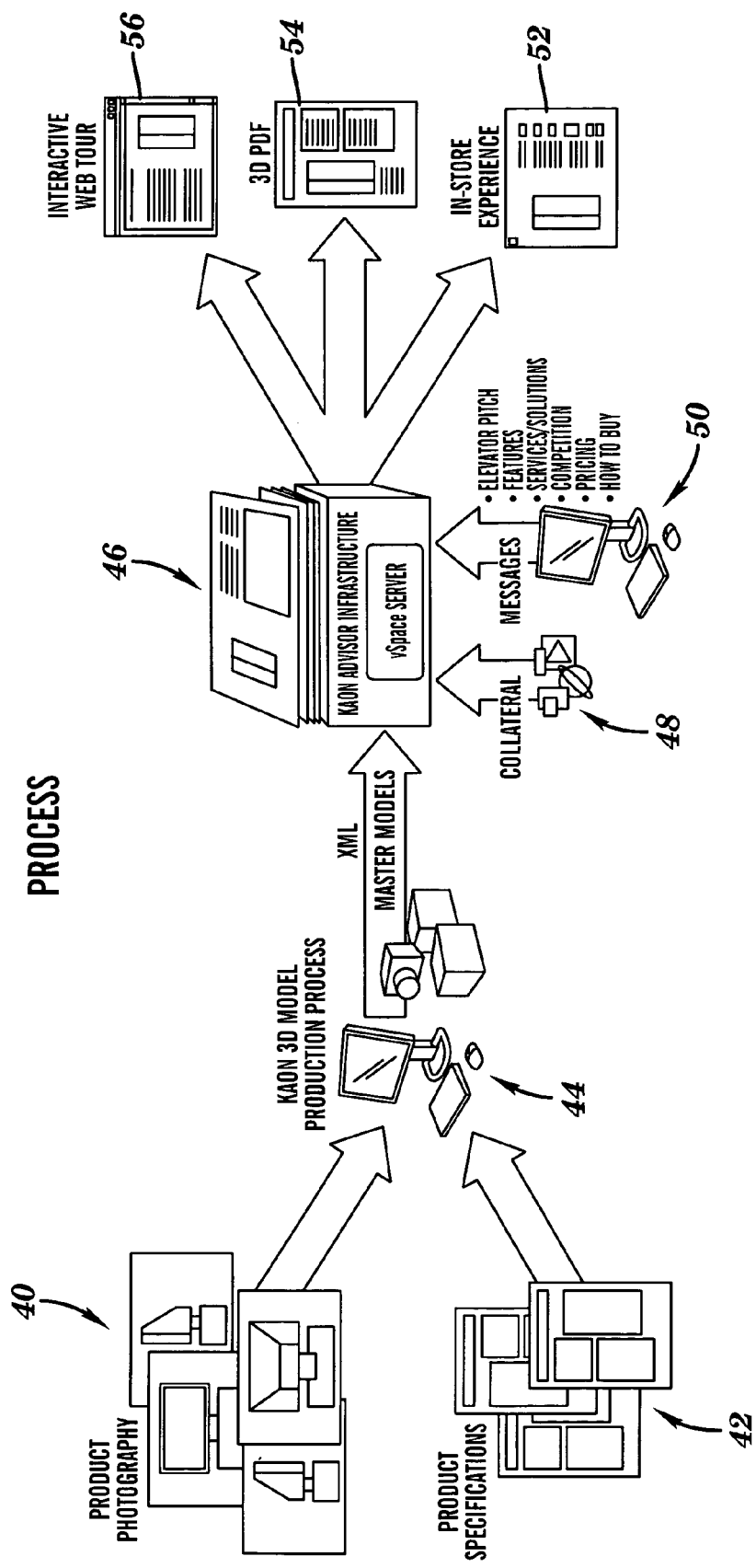
FIG. 5 is a diagram illustrating a method of making a system for displaying one or more products in accordance with other embodiments of the present invention.

The process for creating the models of the products for the product visualization and interaction systems 10 will now be described with reference to FIG. 5. In step 40, photographs of each of the products to be displayed in the product visualization and interaction system 10 are taken from a variety of sides of each of the products and with different lighting, although other types of images can be taken and used, such as photographic images which have been textured onto the virtual product model. The photographic (product image) data for each of the products is stored in the management server system 24, although some or all of the data can be stored at other locations, such as in the product visualization and interaction system 10.

In step 42, product specification data for each of the products to be displayed is entered and/or obtained from other sources and is stored in the management server system 24, although some or all of this data can be stored at other locations, such as in the product visualization and interaction system 10.

In step 44, the virtual product model for each product to be displayed is generated resulting in the delivery of a set of files comprising the "master models" for the product, including the geometric description of the product and all of its relevant components, animation sequences for all moving parts that will be displayed, and textual content that will accompany the geometric representation of the product and its components.

In step 48, the combination of all the files assembled in step 44 is organized into searchable and indexed format. In step 50, the textual content is indexed so that it can be associated with all the geometric components and animations defined in step 44, and can be called upon from within a user interface. Meanwhile, in step 46, the user interface is assembled dynamically by the system 10, associating all of the products available through step 44, and linking actions available to the user to the collection of products, animations, and textual messages for each specific user action. Also in step 46, the detailed output format from the user selections (i.e. steps 56, 54, and 52) are indexed into available user actions, so that any action taken by the user is pre-sequenced, and results in an immediate associated display.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for displaying one or more products, the method comprising:
    providing a kiosk on a floor of a retail store;
    displaying a substantially life size, virtual, three-dimensional view of at least one product and textual content associated with the at least one product on a display system in the kiosk, the display system extending from the floor of the retail store to a height suitable for accommodating the substantially life size, virtual, three-dimensional view of the at least one product;
    selecting in the retail store at least one action with the virtual, three-dimensional view of the product on the display system in the kiosk; and
    displaying in the retail store a virtual, three-dimensional animation of the selected action with the product on the display system in the kiosk.

2. The method as set forth in claim 1 wherein the virtual, three-dimensional animation comprises performing in three dimensions at least one operational feature of the displayed product on the display system.

3. The method as set forth in claim 2 wherein the at least one operational feature comprises at least one of spinning the product, adjusting a viewing size of at least a portion of the product, moving the product, measuring at least a portion of the product, and interacting with at least a portion of the product.

4. The method as set forth in claim 3 wherein the interacting with at least a portion of the product further comprises at least one of opening at least one component of the product, closing at least one component of the product, moving at least one component of the product, adding at least one component to the product, demonstrating the component in operation, demonstrating the component in use with other elements, and removing and rotating the component to show at least two sides of the component.

5. The method as set forth in claim 1 wherein the virtual, three-dimensional animation comprises performing in three dimensions at least one static feature of the displayed product on the display system.

6. The method as set forth in claim 5 wherein the at least one static feature comprises changing lighting and shading on at least a portion of the product.

7. The method as set forth in claim 1 wherein displayed dimensions of the product are substantially scaled to actual dimensions of the product.

8. The method as set forth in claim 7 wherein the displayed dimensions and the actual dimensions are substantially the same to provide a substantially life size display of the product.

9. The method as set forth in claim 8 wherein the selecting further comprises using a touch screen panel interface on the display system.

10. The method as set forth in claim 1 wherein the selecting further comprises using at least one of a touch screen panel interface on the display system, a voice-activated interface coupled to the display system, and an input device spaced from and coupled to the display system.

11. The method as set forth in claim 1 further comprising:
providing a plurality of products to select from for the virtual, three-dimensional view of the product on the display system; and
selecting one of the plurality of products for the displaying on the display system.

12. The method of claim 1 further comprising updating information about the product.

13. The method of claim 1 wherein the displaying further comprises displaying a list of the one or more products.

14. The method of claim 1 wherein the displaying comprises displaying the at least one action via a dynamically assembled user interface.

15. The method of claim 1 wherein the at least one action is a feature, a view or a finish of the product.

16. The method of claim 1 wherein the displaying comprises displaying the at least one action on an additional display coupled to and physically separate from the display system in the kiosk.

17. A system for displaying one or more products, the system comprising:
an in-store kiosk for a use on a floor of a retail store;
a display system in the in-store kiosk that displays a substantially life size virtual, three-dimensional view of a product and textual content associated with the product, the display system extending from the floor of the retail store to a height suitable for accommodating the substantially life size, virtual, three-dimensional view of the at least one product;
a selection system at the in-store kiosk that selects in response to operator input at least one of one or more actions taken with the interactive view of the product on the display system in the in-store kiosk; and
an interactive display processing system that stores and provides the virtual, three-dimensional view of the product to the display system in the in-store kiosk and stores and provides a three-dimensional animation of the one or more of the actions to the display system in the in-store kiosk based on the selections from the selection system.

18. The system as set forth in claim 17 wherein the three-dimensional animation stored and provided by the interactive display processing system comprises an animation that performs at least one operational feature of the displayed product on the display system.

19. The system as set forth in claim 18 wherein the at least one operational feature comprises at least one of spinning the product, adjusting a viewing size of at least a portion of the product, moving the product, measuring at least a portion of the product, and interacting with at least a portion of the product.

20. The system as set forth in claim 19 wherein the interacting with at least a portion of the product further comprises at least one of opening at least one component of the product, closing at least one component of the product, moving at least one component of the product, adding at least one component to the product, demonstrating the component in operation, demonstrating the component in use with other elements, and removing and rotating the component to show at least two sides of the component.

21. The system as set forth in claim 17 wherein the three-dimensional animation stored and provided by the interactive display processing system comprises performing in three dimensions at least one static feature of the displayed product on the display system.

22. The system as set forth in claim 21 wherein the at least one static feature comprises changing lighting and shading on at least a portion of the product.

23. The system as set forth in claim 17 further comprising displayed dimensions of the product on the display system that are substantially scaled to actual dimensions of the product.

24. The system as set forth in claim 23 wherein the displayed dimensions and the actual dimensions on the display system are substantially the same and the display system is sized to provide a substantially life size view of the product.

25. The system as set forth in claim 24 wherein the selection system comprises a touch screen panel interface on the display system.

26. The system as set forth in claim 17 wherein the selection system comprises at least one of a touch screen panel interface on the display system, a voice-activated interface coupled to the display system, and an input device spaced from and coupled to the display system.

27. The system as set forth in claim 17 wherein the interactive display processing system stores and provides a plurality of the products to select from on the display system and the selection system selects in response to operator input one of the plurality of products for the displaying on the display system.

28. The system of claim 17 further comprising a management server to provide an update information about the product.

29. The system of claim 17 further comprising an additional display coupled to and physically separated from the display system in the kiosk for displaying the one or more actions.

30. The system of claim 29 wherein the additional display is configured to display the one or more actions via a dynamically assembled user interface.

31. The system of claim 17 wherein the at least one of the one or more actions is a feature, a view or a finish of the product.

32. The system of claim 17 wherein the display system is substantially of dimensions 6'×8'.

33. A method for making a system for displaying one or more products, the method comprising:
providing a display system in an in-store kiosk for a use on a floor of a retail store that displays a substantially life size, virtual, three-dimensional view of a product and textual content associated with the product, the display system extending from the floor of the retail store to a height suitable for accommodating the substantially life size, virtual, three-dimensional view of the at least one product;

providing a selection system at the in-store kiosk that selects in response to operator input at least one of one or more actions taken with the interactive view of the product; and providing an interactive display processing system that stores and provides the virtual, three-dimensional view of the product to the display system at the in-store kiosk and stores and provides a three-dimensional animation of the one or more of the actions to the display system at the in-store kiosk based on the selections from the selection system.

34. The method as set forth in claim 33 wherein the providing an interactive display processing system further comprises storing and providing the three-dimensional animation that performs at least one operational feature of the displayed product on the display system.

35. The method as set forth in claim 34 wherein the at least one operational feature comprises at least one of spinning the product, adjusting a viewing size of at least a portion of the product, moving the product, measuring at least a portion of the product, and interacting with at least a portion of the product.

36. The method as set forth in claim 35 wherein the interacting with at least a portion of the product further comprises at least one of opening at least one component of the product, closing at least one component of the product, moving at least one component of the product, adding at least one component to the product, demonstrating the component in operation, demonstrating the component in use with other elements, and removing and rotating the component to show at least two sides of the component.

37. The method as set forth in claim 33 wherein the providing an interactive display processing system further comprises storing and providing three-dimensional animation that performs in three dimensions at least one static feature of the displayed product on the display system.

38. The method as set forth in claim 37 wherein the at least one static feature comprises changing lighting and shading on at least a portion of the product.

39. The method as set forth in claim 33 wherein the providing an interactive display processing system that stores and provides the virtual, three-dimensional view of the product further comprises storing and providing the virtual, three-dimensional view of the product with displayed dimensions of the product on the display system that are substantially scaled to actual dimensions of the product.

40. The method as set forth in claim 39 wherein the displayed dimensions and the actual dimensions on the display system are substantially the same and wherein the providing the display system further comprises providing the display system that is sized to provide a substantially life size view of the product.

41. The method as set forth in claim 40 wherein the providing the selection system further comprises providing a selection system that comprises a touch screen panel interface on the display system.

42. The method as set forth in claim 33 wherein the providing the selection system further comprises providing a selection system that comprises at least one of a touch screen panel interface on the display system, a voice-activated interface coupled to the display system, and an input device spaced from and coupled to the display system.

43. The method as set forth in claim 33 wherein the providing an interactive display processing system that stores and provides the virtual, three-dimensional view of the product further comprises providing the interactive display processing system that stores and provides a plurality of the products to select from on the display system and wherein the providing the selection system further comprises providing a selection system that selects in response to operator input one of the plurality of products for the displaying on the display system.

44. The method of claim 33, further comprising providing a management server to provide an update information about the product.

45. The method of claim 33, further comprising providing an additional display coupled to and physically separated from the display system in the kiosk for displaying the one or more actions.

46. The method of claim 45, wherein the additional display is configured to display the one or more actions via a dynamically assembled user interface.

* * * * *